United States Patent [19]
Helin et al.

[11] Patent Number: 6,055,439
[45] Date of Patent: Apr. 25, 2000

[54] MOBILE TELEPHONE USER INTERFACE

[75] Inventors: Ari Helin, Nummela; Timo Virranniemi, Raahe; Juha Kenakkala, Pattijoki; Pasi Huttunen, Oulu, all of Finland

[73] Assignee: Nokia Mobile Phones Limited, Salo, Finland

[21] Appl. No.: 08/744,244

[22] Filed: Nov. 5, 1996

[30] Foreign Application Priority Data

Nov. 7, 1995 [FI] Finland ............................ 955340

[51] Int. Cl.[7] .................................................. H04Q 7/32
[52] U.S. Cl. ................................ 455/550; 455/566
[58] Field of Search ............................ 455/550, 566; 379/422; 341/22

[56] References Cited

U.S. PATENT DOCUMENTS

| | | | |
|---|---|---|---|
| 5,212,811 | 5/1993 | Kuge et al. | 455/73 |
| 5,266,949 | 11/1993 | Rossi | 341/22 |
| 5,408,060 | 4/1995 | Muurinen | 200/314 |
| 5,542,103 | 7/1996 | Mottier et al. | 455/566 |
| 5,805,084 | 9/1998 | Männistö | 341/22 |

FOREIGN PATENT DOCUMENTS

| | | |
|---|---|---|
| 0 279 233 | 8/1988 | European Pat. Off. . |
| 0 373 319 A3 | 6/1990 | European Pat. Off. . |
| 0 633 684 A2 | 1/1995 | European Pat. Off. . |

OTHER PUBLICATIONS

GPI abstract for EPO European Patent Application 0 279 233, Raab et al, Aug. 24, 1988.

*Primary Examiner*—Andrew M. Dolinar
*Attorney, Agent, or Firm*—Perman & Green, LLP

[57] ABSTRACT

A mobile telephone user interface that includes a keypad, and which mobile telephone may operate in several different states of operation from the standpoint of a mobile telephone system, is characterized in that a press of a key in a first state of operation activates a first function and in a second state of operation, a second function. For example, when the telephone is in a call conversation state, a press of a SEND key activates a volume adjustment, or when the telephone is in a ready state, a press of an END key activates deletion of characters from a display. The present invention preserves the versatility of a user interface while simplifying a telephone by decreasing the number of keys.

4 Claims, 2 Drawing Sheets

MOBILE TELEPHONE USER INTERFACE

BACKGROUND OF THE INVENTION

The present invention is related to a mobile telephone user interface, and particularly to the control of mobile telephone functions by means of a keypad included in the user interface during different states of operation in which a mobile telephone may operate from the standpoint of a mobile telephone system.

Manufacturers attempt to equip mobile telephones with a versatile user interface that allows the user to easily control mobile telephone functions. An essential part of the user interface of a modern mobile telephone consists of a sufficient selection of keys and a display that operates together with the keypad. To make key operation easy, the most important functions have their own keys or clearly arranged groups of keys. Therefore, in addition to actual telephone keys, or numeric keys and * and # keys, a mobile telephone usually has SEND and END keys for placing and controlling a call, display control keys, such as a CLEAR key, keys for browsing through menus and selecting different functions and settings, and a key or keys for adjusting the volume of the earphone. On the other hand, manufacturers in the field of mobile telephones also are attempting to develop products that are as simple as possible, and to that end, to reduce the number of keys to a minimum. Therefore, a mobile telephone that has been designed to be as inexpensive and simple as possible may have only the above-mentioned telephone keys, SEND and END keys, and a power switch. This requires solutions which preserve the versatility of the user interface regardless of the minimal number of keys.

SUMMARY OF THE INVENTION

A mobile telephone user interface according to the present invention, which includes a keypad and which may operate in several different states of operation from the standpoint of a mobile telephone system, is characterized in that a press of a key in a first state of operation activates a first function, and in a second state of operation, a second function.

In an advantageous embodiment of the present invention, one of the above-mentioned states of operation is a call conversation state and the other is a ready state. Said key is then advantageously a key typically intended for controlling a call.

In an advantageous implementation of the above-mentioned embodiment, a press of the SEND key while the telephone is in the call conversation state activates a volume adjustment. The volume can be adjusted in predefined steps in response to a press of the key that is shorter than a set period, and steplessly in response to a press of the key that is equal in length to or longer than said set period.

In another advantageous implementation of said embodiment, a press of the END key while the telephone is in the ready state activates character deletion from a display. Characters can be deleted one character at a time in response to a press of the key that is shorter than a set period, and all the characters in the display can be deleted at once in response to a press of the key that is equal in length to or longer than said set period.

In yet another advantageous implementation of said embodiment, wherein a call is terminated in response to a press of the END key while the telephone is in the call conversation state, a press of the END key that is equal in length to or longer than a set period also locks the keypad.

In one possible implementation of a user interface according to the present invention, the software of the user interface contains a key variable that is assigned different values corresponding to defined keys when a key is pressed, and a state variable that is assigned different values corresponding to different states of the mobile telephone. When a key is pressed, the value of the key variable is defined according to the state variable.

With a solution according to the present invention, versatile user interface functions can be preserved while simplifying the telephone by reducing the number of keys. The solution exploits the fact that certain keys are unused during certain states of operation of a mobile telephone. The software can contain definitions of keys which do not exist in the device itself. Hence, only minor changes have to be made in the software of the user interface while simplifying the telephone. The additions to the software brought about by operation according to the present invention also are insignificant and easy to realize. As the examples above indicate, use of a key to also represent another key can be quite logical and easy to learn.

DESCRIPTION OF THE DRAWINGS

The present invention and its realization are explained in more detail below, with references to the enclosed drawings.

DETAILED DESCRIPTION OF THE INVENTION

Figure 1:
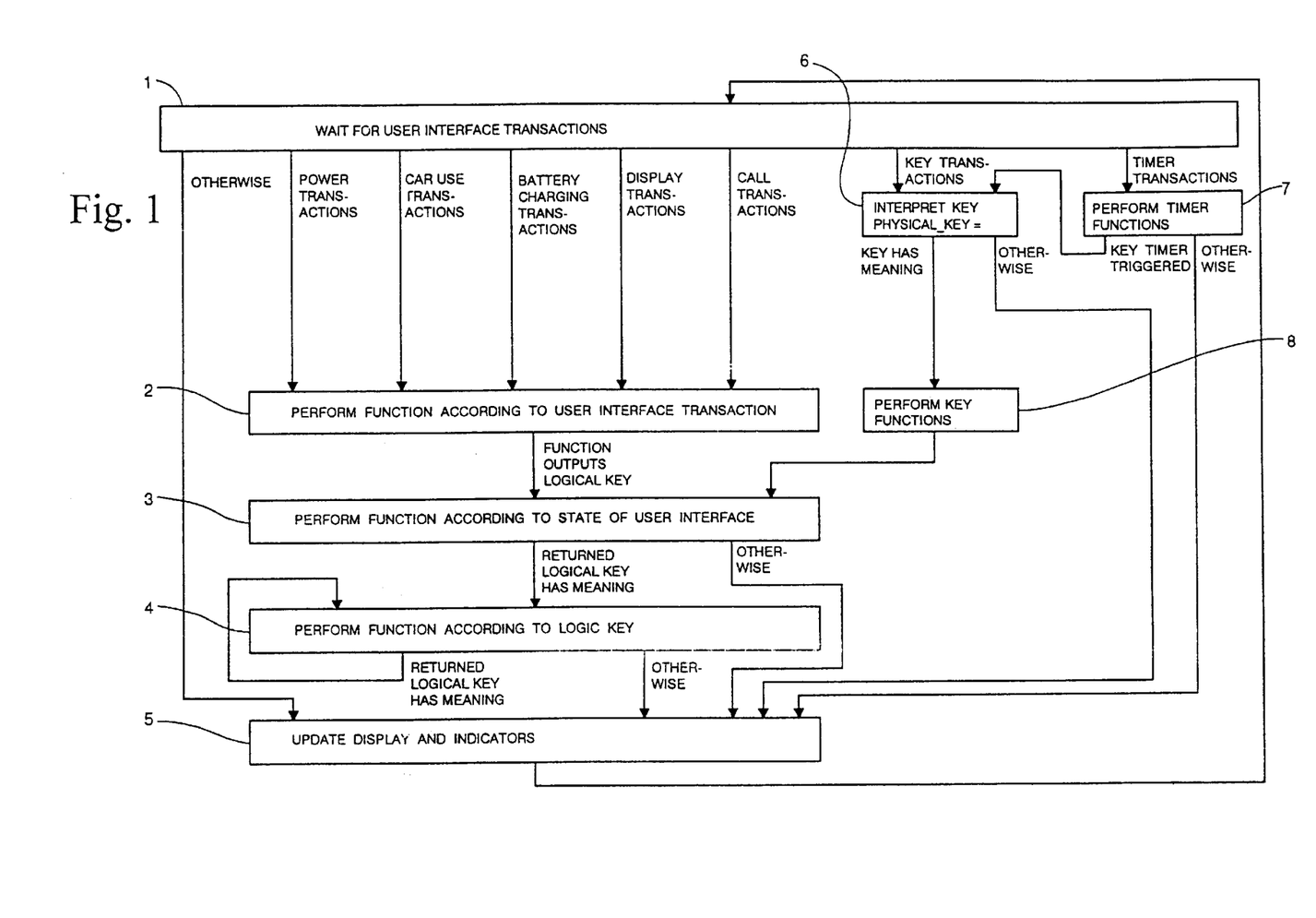
FIG. 1 is a process diagram that presents an example of mobile telephone user interface operation according to the prior art.

In block 1 of the process diagram in FIG. 1, the user interface waits for transactions that originate from said block as shown by arrows, which may be power transactions such as turning the power on and off, car use transactions such as transactions related to hands-free use, battery charging transactions, display transactions such as the appearance of a message on the display, call transactions such as initiating and terminating a call, key transaction such as pressing of keys, and timer transactions. If no transactions occur in the user interface, the display and indicators are periodically updated in block five as shown by the arrow on the left, after which the wait for transactions is resumed in block 1. A transaction in the user interface is generally followed by a primary function in accordance with the transaction, as shown in block 2. For example, a user interface transaction that means the power is to be turned on results in a primary function that switches the power on in the various parts of the mobile telephone as defined by said function. Said function, which is in accordance with the user interface transaction, outputs a logic key and then continues as a user interface state function as shown in block 3, in which a function that the logic key points to in a function table is performed without, for example, activation by a user interface transaction. This function also outputs a logic key, and if said key has no meaning in the present state, the display and indicators are updated in block 5, after which the wait for transactions is resumed in block 1. If said logic key does have meaning in the present state, the function it points to in the function table is performed in block 4, which also outputs a logic key, and if said logic key has no meaning, the display and indicators are updated and the wait for new transactions is resumed. If said logic key has meaning, block 4 is returned to, the appropriate function is performed, and performance of the loop continues until the logic key has no meaning or the function returns the value of the logic key to zero, whereupon performance of the functions terminates. Each function outputs a logic key, and if said key has meaning in the present state, a new function that the logic key points to in a logic table is performed until the value of the outputted logic key is zero, whereupon performance of the functions is terminated for the present.

A press of a key results in interpretation of the key in the user interface as shown in block 6, in which the key variable, which here is referred to as physical_key, is assigned a value corresponding to the pressed key. In a user interface according to the prior art, each key defined in the software corresponds to a physical key, and the value assigned to the key variable uniquely corresponds to said key, which is defined in the software and physically exists. If the key has no meaning in the present state of the mobile telephone, the display and indicators are updated and the wait for new transactions is resumed. Pressing the SEND key during a call is an example of a situation in which a key has no meaning. Nothing happens as a result of pressing the SEND key. If the key does have meaning, the functions of the procedure in block 8 common to all keys are performed, after which, in block 3, the following functions according to the state of the user interface are performed, and so on.

The press of a key may also be interpreted according to its duration. A press of a key may start a key timer as shown in block 7. If the time during which the key is pressed exceeds a set time limit, in other words, the timer is triggered, the key is interpreted again. If the interpretation indicates that the same key is still being pressed, a first function resulting from the press of the key is usually supplemented by performing a second function. For example, a short press of the CLEAR key deletes the last character entered in the display, and a long press of the CLEAR key clears the display completely.

Figure 2:
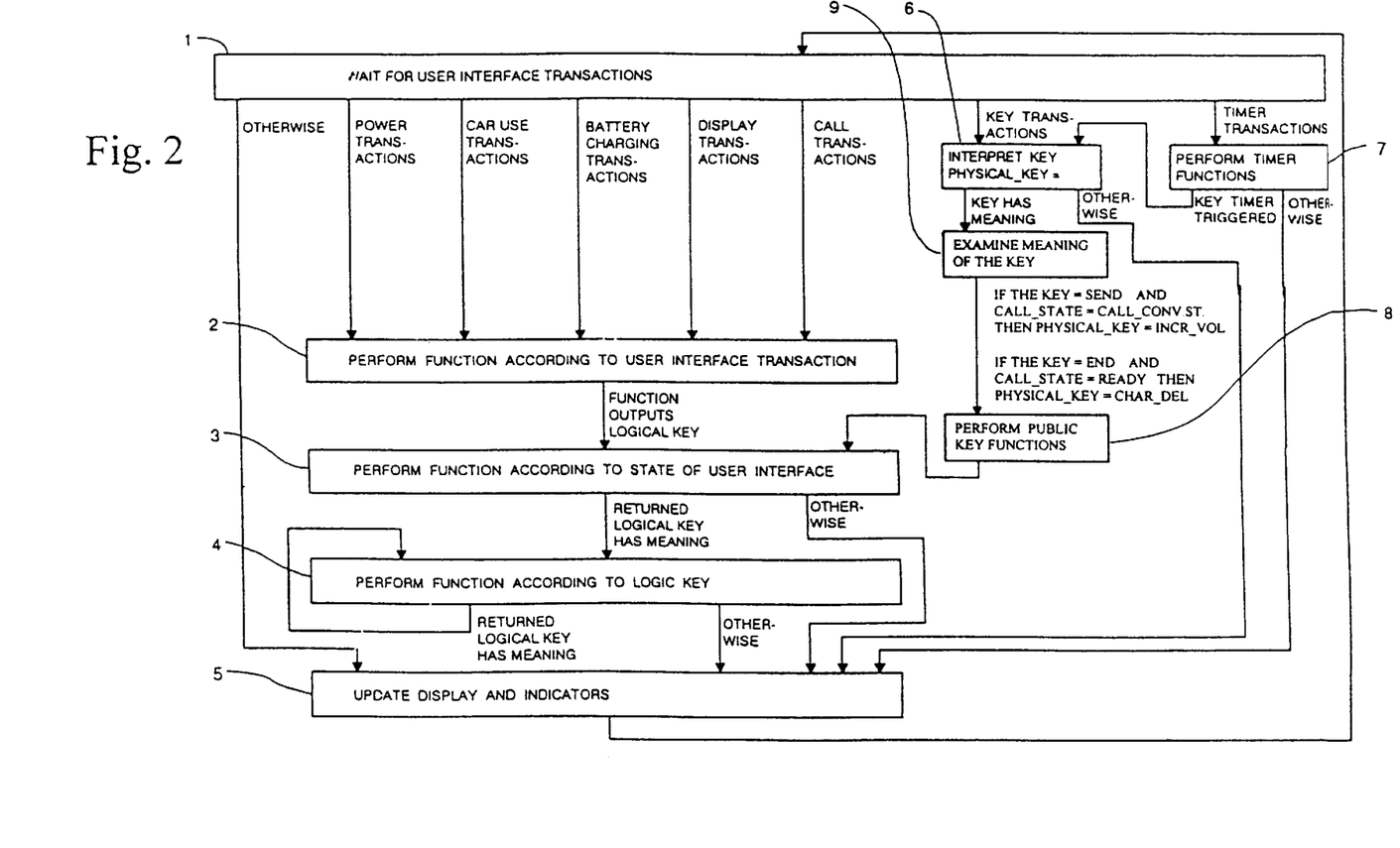
FIG. 2 is a corresponding process diagram that presents a corresponding example of mobile telephone user interface operation according to the present invention.

In FIG. 2, a corresponding example of mobile telephone user interface operation according to the present invention differs from the mobile telephone user interface operation according to the prior art described above in the handling of a key transaction. As in the above, a key transaction is followed by interpretation of the key and assignment of a value corresponding to the pressed physical key to the key variable physical_key. The user interface according to the present invention is characterized in that it has been simplified by reducing the number of physical keys, but at the same time, however, a more versatile selection of keys has been preserved in the software of the user interface, in other words, the number of defined keys is greater than the number of physical keys. Therefore, a function block 9, in which the meaning of a key is examined, has been added to the user interface according to the present invention. The meaning of a key is examined according to the state of operation of the mobile telephone. For example, the SEND key in the diagram is selected, and at the beginning of the examination of the key, the value of the key variable physical_key is the corresponding value of the SEND key, which here is simply labeled SEND. A variable that indicates the state of the mobile telephone is also defined in the user interface of the mobile telephone, which variable here is labeled call_state, and which is assigned a value dependent on the present state of operation. If the state variable call_state has a value that indicates the telephone is in call conversation state, here labeled call_conv_st, the key variable physical_key is assigned a new value, here labeled incr_vol, which is a key variable value corresponding to an 'earphone volume adjustment' key defined in the software. In other words, in this case the SEND key is assigned the meaning of an 'earphone volume adjustment' key in a conventional user interface, even though such a key does not now physically exist in the mobile telephone. From here on the operation of the user interface continues in the same manner as the operation of the user interface according to the prior art. Performance of function block 9 may be conditional, so that it is performed only for keys and corresponding key variable values that may be assigned alternative meanings. If such a key is not in question, block 8 is performed. If, for example, in examining the meaning of the SEND key, the value of the state variable is something other than that which indicates speech, the value of the key variable corresponding to the SEND key is unchanged and the appropriate functions are performed.

In a conventional user interface, there are two keys for adjusting the volume of the earphone, of which one increases and the other decreases the volume. In the solution according to the present invention, in the call conversation state the SEND key can be assigned a key variable value corresponding to a key that decreases the volume of the earphone. The operation of this key could then be such that each press of the key results in a decrease in the volume to the next lower level, and when the lowest level is reached, the volume returns to the highest level. The operation may also be such that the volume can be adjusted in predefined steps in response to a press of the key that is shorter than a set period, and steplessly in response to a press of the key that is equal in length to or longer than said set period.

In an advantageous embodiment of the present invention, the SEND key is assigned the meaning of a key that adjusts the volume of the earphone in said manner in the call conversation state, when the SEND key normally has no meaning. Correspondingly, the END key normally has meaning only in the call conversation state, when a call is terminated by pressing the END key and the mobile telephone enters the ready state. In other states, such as the ready state, the END key therefore can be assigned other meanings. An advantageous implementation is to assign the meaning of a CLEAR key to the END key in the other states. At the same time, the function that is dependent on how long the CLEAR key is pressed can be preserved, whereupon in states other than the call conversation state, a short press of the END button removes the character last entered and a long press clears the display. In the call conversation state, a short press terminates a call and a long press also locks the keypad.

In the described embodiment, call control keys are assigned alternative meanings and they are used to activate different functions that are dependent on different states of operation, such as a call conversation state and a ready state, from the standpoint of a mobile telephone system. It is clear to a person skilled in the art that this is just one possible way to realize a user interface according to the present invention. It is just as easy to assign alternative meanings to other keys and they can be used to activate different functions in different states of operation from the standpoint of the system by means of the solution according to the present invention, in which the software of the user interface contains a broad selection of defined keys, but not all the keys have a corresponding physical key in the selection of mobile telephone keys, which has been minimized for simplicity. It is clear that there may be many states of operation in which a key is assigned different meanings and activates different functions, and also more meanings and activated functions than the two presented in the above examples.

A person skilled in the art also understands that the above example of an implementation of the mobile telephone user interface according to the present invention is just one alternative that may be varied within the scope of the present invention, and a user interface that realizes the operation according to the present invention may be realized in other ways.

The present invention may vary within the scope of the enclosed claims.

We claim:

1. A mobile telephone user interface that includes a keypad, and which mobile telephone may operate in several different states of operation from the standpoint of a mobile telephone system, characterized in that a press of a key in a first state of operation activates a first function; and in a second state of operation, a second function; wherein one of the states of operation is a call conversation state and the other state is a ready state;

said key is typically a key intended for controlling a call; and wherein, when the telephone is in the call conversation state, a press of a SEND key activates a volume adjustment.

2. A mobile telephone user interface that includes a keypad, and which mobile telephone may operate in several different states of operation from the standpoint of a mobile telephone system, characterized in that a press of a key in a first state of operation activates a first function and in a second state of operation, a second function; wherein one of the states of operation is a call conversation state and the other state is a ready state; and said key is typically a key intended for controlling a call; and wherein, when the telephone is in the call conversation state, a press of a SEND key activates a volume adjustment; and further characterized in that the volume can be adjusted in predefined steps in response to a press of the key that is shorter than a set period, and steplessly in response to a press of the key that is equal in length to or longer than said set period.

3. A mobile telephone user interface that includes a keypad, and which mobile telephone may operate in several different states of operation from the standpoint of a mobile telephone system, characterized in that a press of a key in a first state of operation activates a first function; and in a second state of operation, a second function;

One of the states of operation is a call conversation state and the other state is a ready state; and said key is typically a key intended for controlling a call;

wherein, when the telephone is in the ready state, a press of the END key activates character deletion from a display.

4. The user interface according to claim 3, characterized in that characters can be deleted one character at a time in response to a press of the key that is shorter than a set period, and all the characters in the display can be deleted at once in response to a press of the key that is equal in length to or longer than said set period.

* * * * *

US006055439C1

(12) EX PARTE REEXAMINATION CERTIFICATE (8676th)

United States Patent
Helin et al.

(10) Number: US 6,055,439 C1
(45) Certificate Issued: Nov. 22, 2011

(54) MOBILE TELEPHONE USER INTERFACE

(75) Inventors: Ari Helin, Nummela (FI); Timo Virranniemi, Raahe (FI); Juha Kenakkala, Pattijoki (FI); Pasi Huttunen, Oulu (FI)

(73) Assignee: Mobilemedia Ideas LLC, Chevy Chase, MD (US)

Reexamination Request:
No. 90/011,433, Jan. 14, 2011

Reexamination Certificate for:
Patent No.: 6,055,439
Issued: Apr. 25, 2000
Appl. No.: 08/744,244
Filed: Nov. 5, 1996

(30) Foreign Application Priority Data

Nov. 7, 1995 (FI) .................................................. 955340

(51) Int. Cl.
*H04M 1/247* (2006.01)
*H04M 1/725* (2006.01)
*H04M 1/72* (2006.01)

(52) U.S. Cl. ...................................... 455/550.1; 455/566
(58) Field of Classification Search .................... 455/550
See application file for complete search history.

(56) References Cited

To view the complete listing of prior art documents cited during the proceeding for Reexamination Control Number 90/011,433, please refer to the USPTO's public Patent Application Information Retrieval (PAIR) system under the Display References tab.

*Primary Examiner* — Scott L. Weaver (57) ABSTRACT

A mobile telephone user interface that includes a keypad, and which mobile telephone may operate in several different states of operation from the standpoint of a mobile telephone system, is characterized in that a press of a key in a first state of operation activates a first function and in a second state of operation, a second function. For example, when the telephone is in a call conversation state, a press of a SEND key activates a volume adjustment, or when the telephone is in a ready state, a press of an END key activates deletion of characters from a display. The present invention preserves the versatility of a user interface while simplifying a telephone by decreasing the number of keys.

US 6,055,439 C1

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 3 and 4 is confirmed.

New claims 5 and 6 are added and determined to be patentable.

Claims 1 and 2 were not reexamined.

*5. The mobile telephone user interface of claim 3 wherein the character is a non-numeric character.*

*6. The mobile telephone user interface of claim 3 further comprising a second key, such that when the second key is depressed in the call conversation state a first function is activated and when depressed in the ready state a second function is activated.*

\* \* \* \* \*

US006055439C2

(12) EX PARTE REEXAMINATION CERTIFICATE (9229th)
United States Patent
Helin et al.

(10) Number: US 6,055,439 C2
(45) Certificate Issued: Aug. 21, 2012

(54) MOBILE TELEPHONE USER INTERFACE (75) Inventors: Ari Helin, Nummela (FI); Timo Virranniemi, Raahe (FI); Juha Kenakkala, Pattijoki (FI); Pasi Huttunen, Oulu (FI)

(73) Assignee: Mobilemedia Ideas LLC, Chevy Chase, MD (US)

Reexamination Request:
No. 90/012,000, Nov. 3, 2011

Reexamination Certificate for:
Patent No.: 6,055,439
Issued: Apr. 25, 2000
Appl. No.: 08/744,244
Filed: Nov. 5, 1996

Reexamination Certificate C1 6,055,439 issued Nov. 22, 2011

(51) Int. Cl.
*H04Q 7/32* (2006.01)

(52) U.S. Cl. ....... 455/550; 455/566

(58) Field of Classification Search ............ None
See application file for complete search history.

(56) References Cited

To view the complete listing of prior art documents cited during the proceeding for Reexamination Control Number 90/012,000, please refer to the USPTO's public Patent Application Information Retrieval (PAIR) system under the Display References tab.

*Primary Examiner* — K. M. Reichle (57) ABSTRACT

A mobile telephone user interface that includes a keypad, and which mobile telephone may operate in several different states of operation from the standpoint of a mobile telephone system, is characterized in that a press of a key in a first state of operation activates a first function and in a second state of operation, a second function. For example, when the telephone is in a call conversation state, a press of a SEND key activates a volume adjustment, or when the telephone is in a ready state, a press of an END key activates deletion of characters from a display. The present invention preserves the versatility of a user interface while simplifying a telephone by decreasing the number of keys.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 3-6 is confirmed.

Claims 1-2 were not reexamined.

* * * * *

US006055439C3

(12) EX PARTE REEXAMINATION CERTIFICATE (10464th)

United States Patent
Helin et al.

(10) Number: US 6,055,439 C3
(45) Certificate Issued: Jan. 5, 2015

(54) MOBILE TELEPHONE USER INTERFACE

(75) Inventors: Ari Helin, Nummela (FI); Timo Virranniemi, Raahe (FI); Juha Kenakkala, Pattijoki (FI); Pasi Huttunen, Oulu (FI)

(73) Assignee: Mobilemedia Ideas LLC, Chevy Chase, MD (US)

Reexamination Request:
No. 90/012,450, Aug. 23, 2012

Reexamination Certificate for:
Patent No.: 6,055,439
Issued: Apr. 25, 2000
Appl. No.: 08/744,244
Filed: Nov. 5, 1996

Reexamination Certificate C1 6,055,439 issued Nov. 22, 2011

Reexamination Certificate C2 6,055,439 issued Aug. 21, 2012

(51) Int. Cl.
*H04M 1/72* (2006.01)
*H04M 1/725* (2006.01)
*H04M 1/247* (2006.01)

(52) U.S. Cl.
USPC ........................... 455/550.1; 455/566

(58) Field of Classification Search
None
See application file for complete search history.

(56) References Cited

To view the complete listing of prior art documents cited during the proceeding for Reexamination Control Number 90/012,450, please refer to the USPTO's public Patent Application Information Retrieval (PAIR) system under the Display References tab.

*Primary Examiner* — Minh Dieu Nguyen (57) ABSTRACT

A mobile telephone user interface that includes a keypad, and which mobile telephone may operate in several different states of operation from the standpoint of a mobile telephone system, is characterized in that a press of a key in a first state of operation activates a first function and in a second state of operation, a second function. For example, when the telephone is in a call conversation state, a press of a SEND key activates a volume adjustment, or when the telephone is in a ready state, a press of an END key activates deletion of characters from a display. The present invention preserves the versatility of a user interface while simplifying a telephone by decreasing the number of keys.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 3-6 are cancelled.

Claims 1-2 were not reexamined.

* * * * *